(12) United States Patent
Florence

(10) Patent No.: US 6,554,536 B1
(45) Date of Patent: Apr. 29, 2003

(54) LININGS FOR SEWERS

(75) Inventor: Geoffrey Lewis Florence, Chatham (GB)

(73) Assignee: Channeline Sewer Systems Limited, Kent (GB)

( * ) Notice: Subject to any disclaimer, the term of this patent is extended or adjusted under 35 U.S.C. 154(b) by 0 days.

(21) Appl. No.: 09/543,222

(22) Filed: Apr. 5, 2000

(30) Foreign Application Priority Data

Jan. 5, 2000 (GB) .............................................. 0000114

(51) Int. Cl.⁷ .......................... E21D 11/00; B29C 39/10
(52) U.S. Cl. ...................... 405/152; 405/135; 405/134; 264/256
(58) Field of Search ................................ 405/134, 135, 405/132, 150.1, 150.2, 151, 152, 153; 264/255, 256, 257

(56) References Cited

U.S. PATENT DOCUMENTS

| | | | |
|---|---|---|---|
| 3,640,076 A | * 2/1972 | Rees et al. .................. | 405/152 |
| 3,923,937 A | * 12/1975 | Piccioli et al. .............. | 264/255 |
| 4,685,873 A | * 8/1987 | Willard et al. .............. | 264/257 |
| 4,728,223 A | * 3/1988 | Rice ........................... | 405/156 |
| 4,957,683 A | 9/1990 | Hartmann ................... | 264/256 |
| 6,123,879 A | * 9/2000 | Hendrix et al. ............. | 264/257 |
| 6,284,336 B1 | * 9/2001 | Greene ....................... | 264/257 |

FOREIGN PATENT DOCUMENTS

| | | |
|---|---|---|
| GB | 1391777 | 4/1975 |
| GB | 2037930 A | 7/1980 |

* cited by examiner

*Primary Examiner*—Frederick L. Lagman
(74) *Attorney, Agent, or Firm*—Perman & Green, LLP

(57) ABSTRACT

During manufacture of a sewer or tunnel lining section, sand-resin material is deposited over a mould, to define a central part of the section. Sand-resin material is removed using a wire arranged to lie a predetermined radial distance from the surface of the mould. The wire is passed around the surface of the sand-resin layer whilst maintaining the predetermined radial distance, the predetermined radial distance comprising, or being slightly greater than a preset minimum thickness. The use of a wire to remove excess sand-resin material has been found to be particularly effective, and surprisingly the excess material does not re-adhere to the underlying surface after the wire has passed. This is despite the required tackiness of the sand-resin mixture.

7 Claims, 2 Drawing Sheets

LININGS FOR SEWERS

FIELD OF THE INVENTION

This invention relates to systems for lining sewers, tunnels and the like, for restoring sewer or tunnel systems, the original structure of which has degraded over time. The invention particularly concerns a method of manufacturing lining sections.

BACKGROUND OF THE INVENTION

In the particular example of sewers, the sewer gas hydrogen sulphide reacts to form sulphuric acid, which attacks the mortar within the brickwork of existing sewers. Various lining systems are known, in which a lining is provided within the existing sewer or tunnel system and in which a grout, for example concrete, is introduced into the spacing between the new liner and the original structure.

The resulting sewer or tunnel wall, which comprises the original decaying structure, the grout material and the lining, is subjected to a different distribution of stresses to the original structure. In particular, this change in the stress distribution can result in a large reduction or elimination of the tensile stress in the original wall, which tensile stress typically leads to cracking and crumbling of the original wall, particularly in cases where the mortar of a brickwork structure has been under chemical attack. The level of compressive stresses in the original structure will also be reduced by the introduction of the lining system. The lining also acts as a barrier to prevent further chemical decay of the original structure.

A lining system typically comprises a number of lining sections butted end-to-end in order to form the lining for a sewer system. Each lining section may be a single closed loop or, it may comprise a number of arcuate portions connected together by appropriate joints to form the loop.

This invention is concerned in particular with the manufacture of a lining system in which the material of the lining comprises a sandwich structure having an inner and an outer fibreglass-resin layer, and a sand-resin layer sandwiched between them. A known manufacturing process for the lining is essentially manual, and involves depositing a fibreglass layer of specified thickness over a mould, applying a resin to the fibreglass layer, applying a sand-resin mixture over the fibreglass-resin layer to a desired thickness, depositing a second fibreglass layer of specified thickness over the sand-resin layer, and applying a resin to the second fibreglass layer.

A particular problem encountered in the manufacture of this sandwich structure lies in the control of the thickness of the sand-resin layer. A minimum thickness is specified for the structural properties of the lining. Conventionally, the thickness has been controlled to meet this minimum by using depth gauges, which leave visual tell-tale marks on the surface of the sand resin layer when the desired thickness has been reached or passed. This process is prone to wastage of the sand-resin composition, because the resulting sand-resin layer is thicker than required over most of the area of the structure.

An alternative method of ensuring the desired minimum thickness is obtained involves the use of a tamping device. This is a device which compresses (or displaces) the surface of the sand-resin material using a reciprocating pad, to reach a desired thickness. The sand-resin mixture is intentionally tacky, and indeed it needs to be able to grip to the surface of the underlying fibreglass-resin layer, even against the action of gravity. A problem with this method is that the sand-resin layer can adhere to the tamping pad, and thus become dislodged. Also, due to the essentially incompressible nature of the sand-resin mixture, the tamping process can only achieve the desired thickness for a limited range of depths and only if there is approximately the correct amount of sand-resin mixture to start with.

SUMMARY OF THE INVENTION

According to a first aspect of the invention, there is provided a method of manufacturing a sewer or tunnel lining section, comprising:

forming a fibreglass-resin layer over a mould;

applying a sand-resin mixture over the fibreglass-resin layer to a thickness which results in the combined structure having a thickness greater than a preset minimum thickness;

removing sand-resin material from the surface of the sand-resin layer using a wire arranged to lie a predetermined radial distance from the surface of the mould, the wire being passed around the surface of the sand-resin layer whilst maintaining the predetermined radial distance, the predetermined radial distance comprising, or being slightly greater than, the preset minimum thickness; and forming a second fibreglass-resin layer over the sand-resin layer.

The use of a wire to remove excess sand-resin material has been found to be particularly effective, and surprisingly the excess material does not re-adhere to the underlying surface after the wire has passed. This is despite the required tackiness of the sand-resin mixture.

The first and second fibreglass-resin layers are preferably formed by depositing sheets of fibreglass material and subsequently applying the resin or by spraying particles of fibreglass material to a specified thickness and subsequently applying the resin. Preferably, the mould has a central region where the lining section is formed and side regions which provide guide surfaces, and wherein the wire is arranged to extend between a pair of roller arrangements, the wire being mounted so as to lie a predetermined distance above a surface when the roller arrangements are passed over the guide surfaces.

Each roller arrangement may comprise a single roller, with the wire extending between the two rollers along the axis of rotation of the two rollers or each roller arrangement may comprise two rollers side by side having parallel axes of rotation, the wire being positioned between the two rollers and extending parallel to the axes of rotation of the two rollers between the two roller arrangements.

The invention also provides a method of lining a sewer or tunnel, comprising inserting lining sections of the invention into the sewer or tunnel to form a lining and filling the space between the lining and the wall of the sewer or tunnel with grouting.

According to a second aspect of the invention, there is provided a device for controlling the thickness of a sand-resin mixture in a sewer or tunnel lining section, comprising a wire extending between two roller arrangements, the wire being mounted so as to lie a predetermined distance above a surface when the roller arrangements are passed over the surface.

Each roller arrangement may comprise a single roller, the wire extending between the two rollers along the axis of rotation of the two rollers, or they may each comprise two rollers side by side having parallel axes of rotation, the wire being positioned between the two rollers and extending parallel to the axes of rotation of the two rollers between the two roller arrangements.

BRIEF DESCRIPTION OF THE DRAWINGS

The invention will now be described by way of example, with reference to and as shown in the accompanying drawings in which.

DETAILED DESCRIPTION

Figure 1:
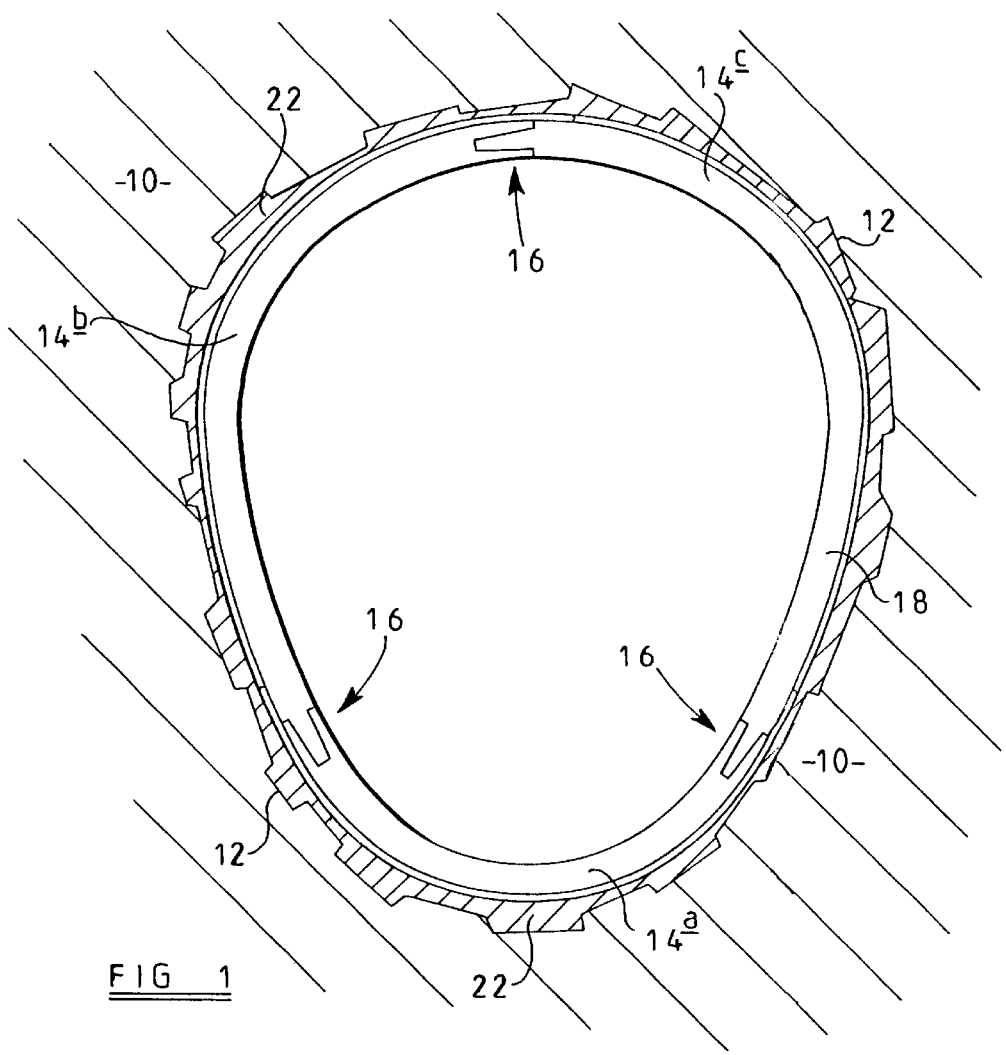
FIG. 1 shows schematically an existing sewer system which has been lined using a lining system manufactured according to the invention.

FIG. 1 shows an existing sewer or other tunnel system 10 in which the wall 12 defining the channel requires repair. For this purpose, a lining 14 is introduced having a cross section which is selected depending upon the shape of the existing passageways. One possible lining structure comprises three sheets as shown in FIG. 1, a base sheet 14a and two side sheets 14b, 14c. The three sheets are coupled together by tongue and groove joints 16 to form the closed loop 18. Alternatively, the closed loop 18 may be defined by a single component. A grout material 22 is introduced between the existing wall 12 and the new lining 14.

One preferred structure of the main body 18 of the lining is described with reference to FIG. 2. The innermost surface of the lining is defined by a glass reinforced plastics layer 40 which provides the main structure of the lining. The plastic layer 40 is formed by applying a thermosetting resin onto a glass fibre mesh, or glass fibre particles which are obtained by passing the mesh (roving) through a chopping gun. The thermosetting resin is of the isophthalic type, for example neopentylglycol. The glass fibre material may comprise corrosion resistant glass, for example having no borosilicone. The glass fibre sheets used to form the layer 40 may comprise a lower surface tissue, which gives rise to a resin rich surface during curing, which provides a chemical barrier for the remainder of the layer 40.

A layer 42 comprising a sand and resin mixture is provided over the plastic layer 40 to give the overall structure the desired thickness. The desired thickness will be a function of the intended stress profile to be obtained when the lining is combined with the grout material 22 and the wall of the original structure. On top of the sand/resin layer 42 is provided a further glass reinforced plastic layer 44 and a layer of aggregate 46 which defines the outer surface of the lining. This aggregate layer 46 provides a key for the grout material to be inserted between the lining and the original structure.

The grout material 22, shown in FIG. 1, comprises a concrete mix, which may be introduced by pumping or spraying.

The method of manufacturing the lining structure described with reference to FIG. 2 will now be explained. A substantially cylindrical mould is provided, as shown in FIG. 3, and is used to produce predetermined lengths of the lining. The outer surface of the substantially cylindrical body 50 of the mould corresponds to the shape of the inner surface of the lining section. Stops 52 are provided which define the width of the section to be manufactured. These stops 52 may define flat end faces of the lining sections, as shown in FIG. 3, or else they may define interlocking shapes, such as tongue and groove joints. The lining sections may then be connected together by these lengthwise tongue and groove joints. The mould has a central region between the two stops 52 where the lining section is formed, and has side regions 54 outside of the stops 52 which provide guide surfaces.

Figure 2:
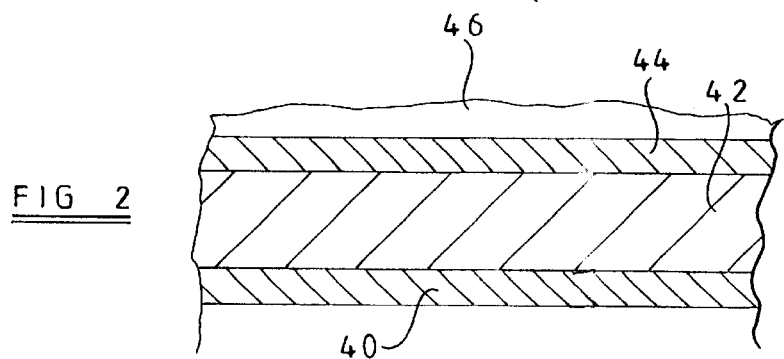
FIG. 2 shows the structure of the lining material.
Figure 3:
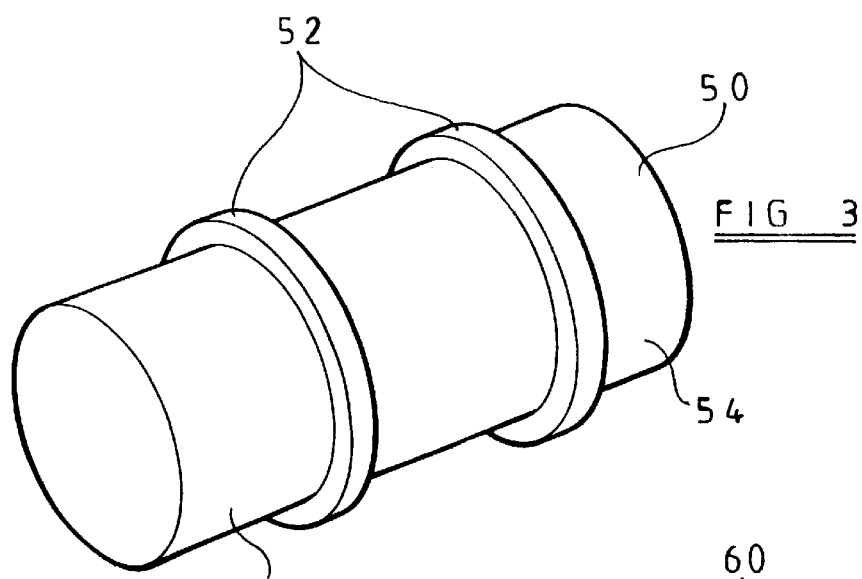
FIG. 3 shows the mould used in the method of the invention.

To manufacture the structure of FIG. 2, a fibreglass-resin layer is formed over the central region of the mould. This is achieved by depositing the fibreglass layer and subsequently impregnating it with suitable resin. The fibreglass layer may be laid down as sheets with a specified thickness, or else smaller particles of fibreglass material may be sprayed on to the surface.

The sand-resin mixture is then deposited over the fibreglass-resin layer. This sand-resin matrix may, for example, comprise one part polyester resin to four parts sand, and there may additionally be provided a chalk-based binder. This mixture is applied manually, for example using a trowel to a desired thickness. The sand-resin layer must exceed a pre-set minimum thickness which is derived from the structural and physical properties of the lining section. The sand-resin layer 42 is significantly thicker than the fibreglass-resin layer 40. For example, the layer 40 may have a thickness of 5 mm, whereas the layer 42 may have a thickness of 25 mm. The thickness of the sand-resin layer can therefore be controlled by ensuring that the total combined thickness reaches a pre-set minimum.

According to the invention, the sand-resin layer is applied to a thickness which results in the two layers 40, 42 having a thickness greater than the pre-set minimum, and sand-resin material is then removed using a wire arrangement. This wire arrangement is located using the guide surfaces 54, and the interaction of the wire arrangement with the guide surfaces 54 is such that the wire is suspended at the pre-set minimum thickness radially above the surface of the mould. By "radial" is meant a distance above the surface of the mould in a direction perpendicular to the tangent to the surface of the mould. The wire is passed around the surface of the sand-resin layer whilst maintaining this predetermined radial distance, and any sand-resin material removed can be caught for subsequent re-use.

After the fibreglass-resin layer 40 and sand-resin layer 42 have been deposited and reduced to the required thickness, a further fibreglass-resin layer 44 is then formed manually over the surface of the sand-resin layer 42.

Figure 4:
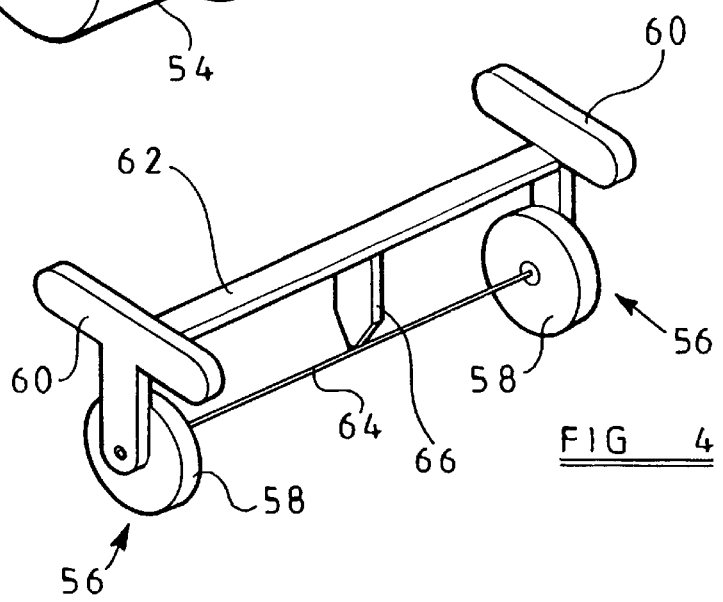
FIG. 4 shows a first example of device of the invention for controlling thickness.

The wire arrangement comprises a wire which extends between a pair of roller arrangements, each of which engages with a respective guide surface 54. As shown in FIG. 4, in a first example of wire arrangement, each roller arrangement 56 comprises a single roller 58 with the wire extending between the two rollers 58 along their axes of rotation. The wire arrangement has handles 60 with a structural supporting rod 62 extending between them. To keep the wire 64 straight, a central support 66 is shown attached to the support member 62. Depending upon the span of the wire 64, more or less than one central support 66 may be required.

With the arrangement shown in FIG. 4, the angle at which the device is held against the guide surfaces 54 is not critical, because the distance between the point of contact of the rollers 58 and the guide surfaces 54 and the wire 64 will always be constant, equalling the radius of the rollers 58. This device may therefore be rolled manually around the mould to obtain the desired thickness of sand-resin mixture.

Figure 5:
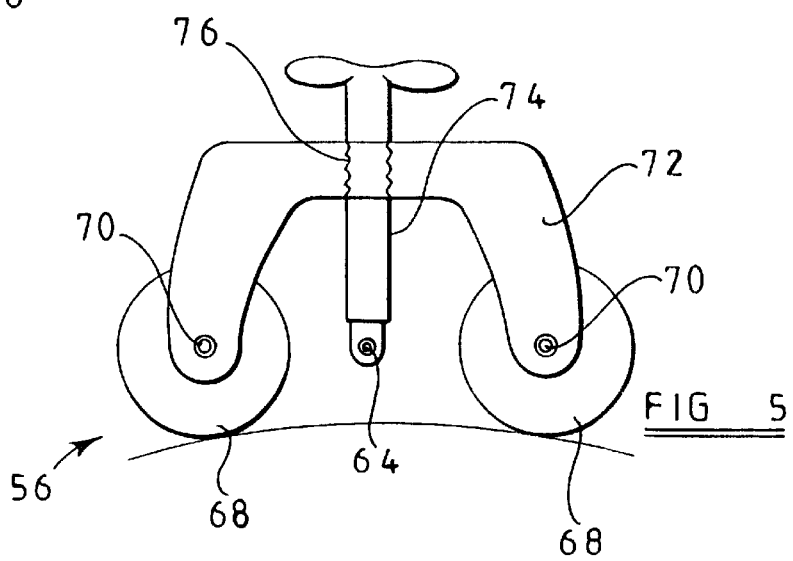
FIG. 5 shows a second example of device for controlling thickness.

An alternative roller arrangement 56 is shown in FIG. 5 which comprises two rollers 68 side by side with their axes of rotation 70 parallel to each other. The wire 64 is positioned between the two rollers 68 and is also parallel to the axes of rotation 70. The rollers 68 are mounted to a support structure 72, and the wire 64 may be supported by a mounting 74 having a threaded outer surface which engages with a threaded bore 76 in the support structure 72. In this way, the height of the wire above the surface of the mould may be adjustable.

The roller arrangement of FIG. 5 approximates the curved surface of the mould as a straight line between the points of contact of the two rollers 68. The perpendicular distance of the wire 64 from this straight line is then constant. This approximation is more accurate for larger radii of curvature, and is also more accurate when the rollers 68 are closer together. Thus, the spacing of the rollers 68 will be selected as a function of the sharpest radius of curvature occurring in the surface of the mould. In the case of the lining shape shown in FIG. 1, the sharpest radius of curvature is at the base of the lining, and the spacing between the rollers 68 will then be selected to achieve a desired accuracy in the radial distance of the wire 64 from the surface of the mould at this part of the lining. The two roller arrangements 56 shown in FIG. 5 are connected together by a support structure similar to that shown in FIG. 4, and there may again be central supports 66, if required.

I claim:

1. A method of manufacturing a sewer or tunnel lining section over a mould having a central section and side regions which provide guide surfaces, comprising:

forming a fiberglass-resin layer over the central section of the mould;

applying a sand-resin mixture over the fiberglass-resin layer to a thickness which results in the combined structure having a thickness greater than a preset minimum thickness;

removing sand-resin material from the surface of the sand-resin layer using a wire arranged to extend between a pair of roller arrangements, the wire being mounted so as to lie a predetermined distance above the guide surfaces when the roller arrangements are passed over the guide surfaces, the wire thereby being arranged to lie a predetermined radial distance from the surface of the mould, the wire being passed around the surface of the sand-resin layer whilst maintaining the predetermined radial distance, the predetermined radial distance comprising, or being slightly greater than, the preset minimum thickness; and forming a second fiberglass-resin layer over the sand-resin layer.

2. A method as claimed in claim 1, wherein the first and second fibreglass-resin layers are formed by depositing sheets of fibreglass material and subsequently applying the resin.

3. A method as claimed in claim 1, wherein the first and second fibreglass-resin layers are formed by spraying particles of fibreglass material to a specified thickness and subsequently applying the resin.

4. A method as claimed in 1 wherein each roller arrangement comprises a single roller, the wire extending between the two rollers along the axis of rotation of the two rollers.

5. A method as claimed in claim 1, wherein each roller arrangement comprises two rollers side by side having parallel axes of rotation, the wire being positioned between the two rollers and extending parallel to the axes of rotation of the two rollers between the two roller arrangements.

6. A sewer or tunnel lining section manufactured using the method of claim 1.

7. A method of lining a sewer or tunnel, comprising:

inserting lining sections of claim 6 into the sewer or tunnel to form a lining; and filling the space between the lining and the wall of the sewer or tunnel with grouting.

\* \* \* \* \*